United States Patent [19]
Müller

[11] Patent Number: 5,915,358
[45] Date of Patent: Jun. 29, 1999

[54] METHOD OF CONTROLLING AN INTERNAL-COMBUSTION ENGINE HAVING AT LEAST TWO INTAKE VALVES FOR EACH CYLINDER

[75] Inventor: Ulrich Müller, Aachen, Germany

[73] Assignee: FEV Motorentechnik GmbH & Co., Aachen, Germany

[21] Appl. No.: 08/976,489

[22] Filed: Nov. 24, 1997

[30] Foreign Application Priority Data

Nov. 29, 1996 [DE] Germany .......................... 196 49 466

[51] Int. Cl.$^6$ .............................. F02B 29/08; F02B 75/12; F02D 13/02
[52] U.S. Cl. ............................................. 123/432
[58] Field of Search .................... 123/302, 308, 123/432, 470

[56] References Cited

U.S. PATENT DOCUMENTS

| | | | |
|---|---|---|---|
| 4,114,371 | 9/1978 | Matsuda | 123/432 X |
| 5,417,190 | 5/1995 | Ando et al. | 123/308 |
| 5,598,819 | 2/1997 | Blackburn | 123/432 X |

*Primary Examiner*—Tony M. Argenbright
*Attorney, Agent, or Firm*—Venable; Gabor J. Kelemen

[57] ABSTRACT

A method of controlling a piston-type internal-combustion engine having a cylinder, first and second intake ports opening into the cylinder, as well as first and second intake valves disposed in the first and second intake ports, respectively, for controlling admission of fuel into the cylinder. The method includes injecting fuel simultaneously into the first and second intake ports during operational cycles of the cylinder; at low engine load operating solely one of the first and second intake valves, while maintaining the other of the first and second intake valves inoperative. The operating step is alternated such that the first and second intake valves are alternatingly in an operative and in an inoperative state during consecutive operational cycles of the cylinder.

1 Claim, 2 Drawing Sheets

METHOD OF CONTROLLING AN INTERNAL-COMBUSTION ENGINE HAVING AT LEAST TWO INTAKE VALVES FOR EACH CYLINDER

CROSS REFERENCE TO RELATED APPLICATION

This application claims the priority of German Application No. 196 49 466.4 filed Nov. 29, 1996, which is incorporated herein by reference.

BACKGROUND OF THE INVENTION

This invention relates to a method for controlling a piston-type internal-combustion engine in which each cylinder is provided with at least two intake valves which, for each cylinder, are coupled to one another by a common intake port into which fuel is introduced by means of at least one fuel injection nozzle and wherein only a single intake valve per stroke is operated in the lower load range.

Piston-type internal-combustion engines having electromagnetic actuators for operating the cylinder valves provide the possibility for a fully variable control of the cylinder valves, wherein in particular the opening and closing moments of the valves as well as the "open" periods of the valves may be determined practically at will. In such engines which thus have at least two intake valves, it is feasible to maintain one of the intake valves closed (inoperative) in the lower load range, so that the entire operation is performed solely by actuating the other intake valve. In such engines the two intake valves are in communication with one another by a common "Siamese" intake port, into which the fuel is introduced by means of at least one fuel injection nozzle. If in the lower load range one of the intake valves is maintained closed so that the entire operation is effected by operating the other valve, in front of the closed valve fuel accumulates which does not gain access to the combustion chamber. Such a circumstance leads to an improper setting of the X-regulation. If now, based on load requirements, the other, heretofore closed intake valve is again rendered operative by means of the control device, the accumulated fuel gains access to the combustion chamber, disadvantageously resulting in an undefined mixture formation. Such an undesired enrichment of the mixture leads to a poor combustion. In case of a long operational period in a single-valve mode, it may even occur that the sudden introduction of the accumulated fuel leads to a mixture which is no longer ignitable. Also, due to the poor combustion, the exhaust gas is high in hydrocarbon pollutants. The exhaust gas values significantly worsen due to the undesired, incorrect mixture formation.

SUMMARY OF THE INVENTION

It is an object of the invention to provide an improved method of controlling a piston-type internal-combustion engine of the above-outlined type from which the discussed disadvantages are eliminated and with which thus a reliable operation with clean exhaust gas values is ensured.

This object and others to become apparent as the specification progresses, are accomplished by the invention, according to which, briefly stated, in a piston-type internal-combustion engine having a cylinder, first and second intake ports opening into the cylinder, as well as first and second intake valves disposed in the first and second intake ports, respectively, the method of controlling the engine includes the following steps: injecting fuel simultaneously into the first and second intake ports during operational cycles of the cylinder; at low engine load operating solely one of the first and second intake valves, while maintaining the other of the first and second intake valves inoperative. The operating step is alternated such that the first and second intake valves are alternatingly in an operative and in an inoperative state for consecutive operational cycles of the cylinder.

The method according to the invention as outlined above has the advantage that in the single-valve operational mode practically no fuel accumulates in front of the inoperative, closed intake valve and thus optimal combustion conditions are obtained. The control device has to be designed such that it is capable of processing data from two combustion cycles and in a single-valve operation it ensures that the alternating operation of both intake valves in each cylinder may take place.

DESCRIPTION OF THE PREFERRED EMBODIMENT

Figure 1:
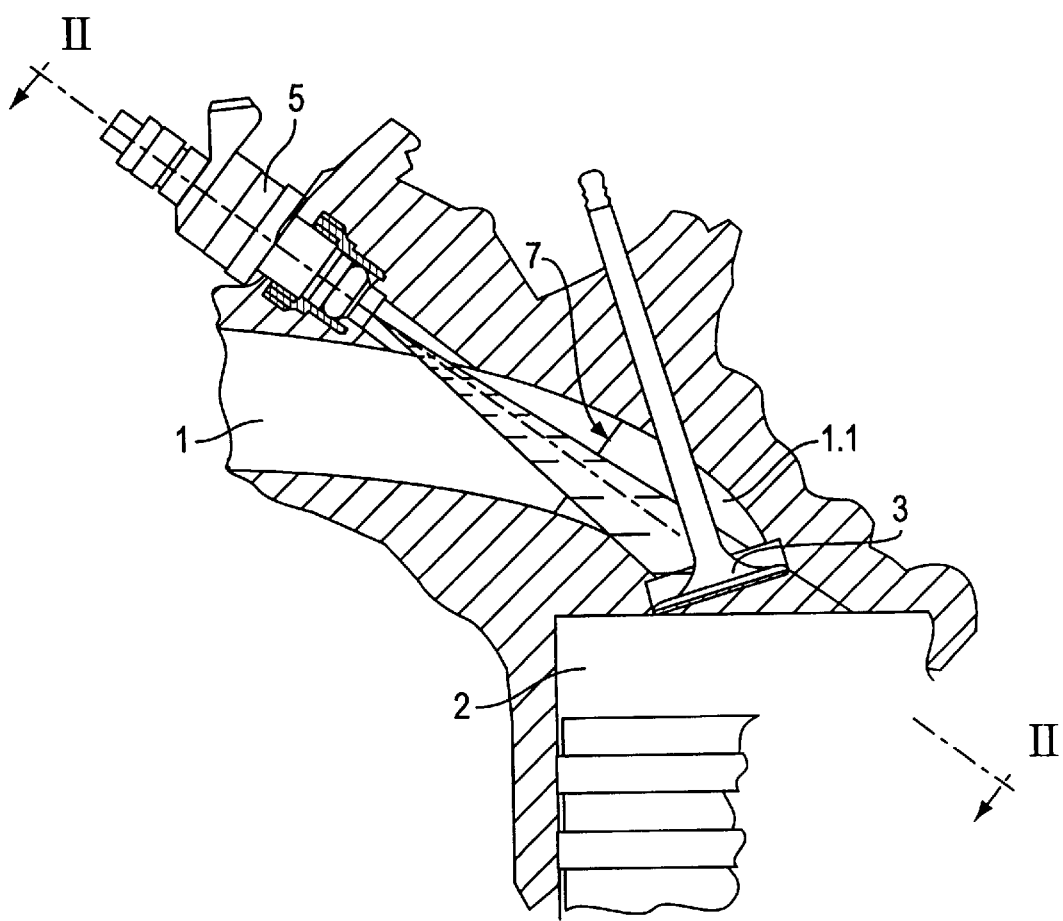
FIG. 1 is a fragmentary sectional schematic side elevational view of an engine cylinder in the region of the intake port.
Figure 2:
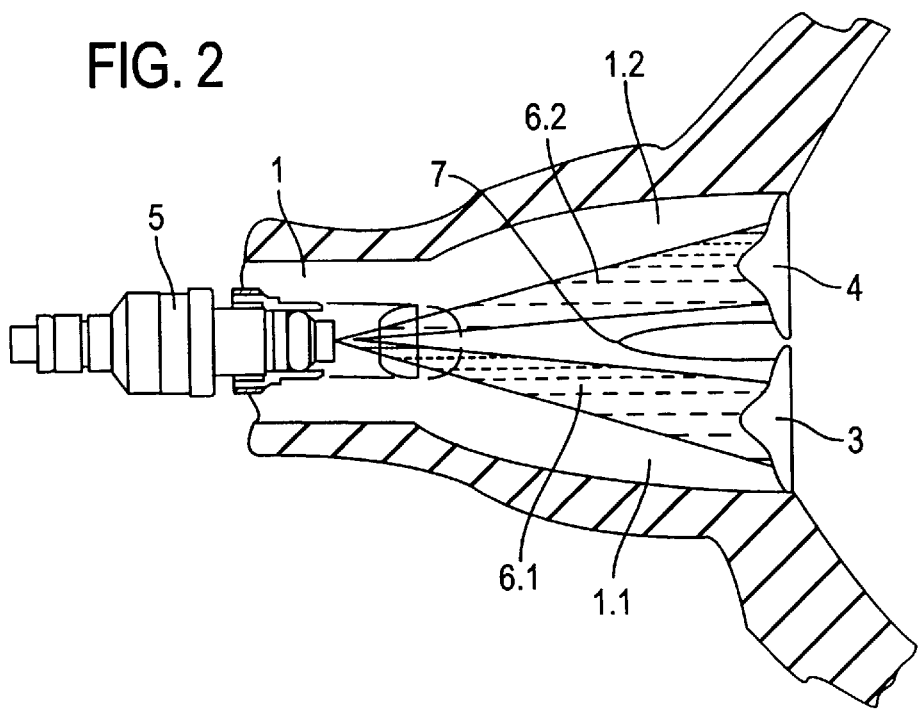
FIG. 2 is a sectional view taken along line II—II of FIG. 1.

In FIG. 1 a region of the intake port 1 of a cylinder 2 of a piston-type combustion engine is shown. As illustrated in FIG. 2, the intake port 1 is a "Siamese" port which is divided into two partial intake ports 1.1 and 1.2 immediately upstream of the cylinder 2, as viewed in the direction of medium flow. Upstream of the division of the intake port into the partial intake ports 1.1 and 1.2 an injection nozzle 5 projects into the intake port 1. The injection nozzle 5 is provided with two injection openings through which a partial fuel jet 6.1 and 6.2 is simultaneously injected into the respective partial intake ports 1.1 and 1.2 when the injection nozzle 5 is operated. The dividing ridge 7 of the two partial intake ports 1.1 and 1.2 is so arranged that a positive separation of the two partial fuel jets 6.1 and 6.2 is achieved.

The two intake valves 3 and 4 are each provided with their own valve actuator, preferably an electromagnetic actuator so that they may be operated independently from one another. The engine control is so designed that in case of a partial load operation, for each cycle (stroke) only a single intake valve is actuated while the other intake valve is maintained inoperative and thus closed.

Figure 3:
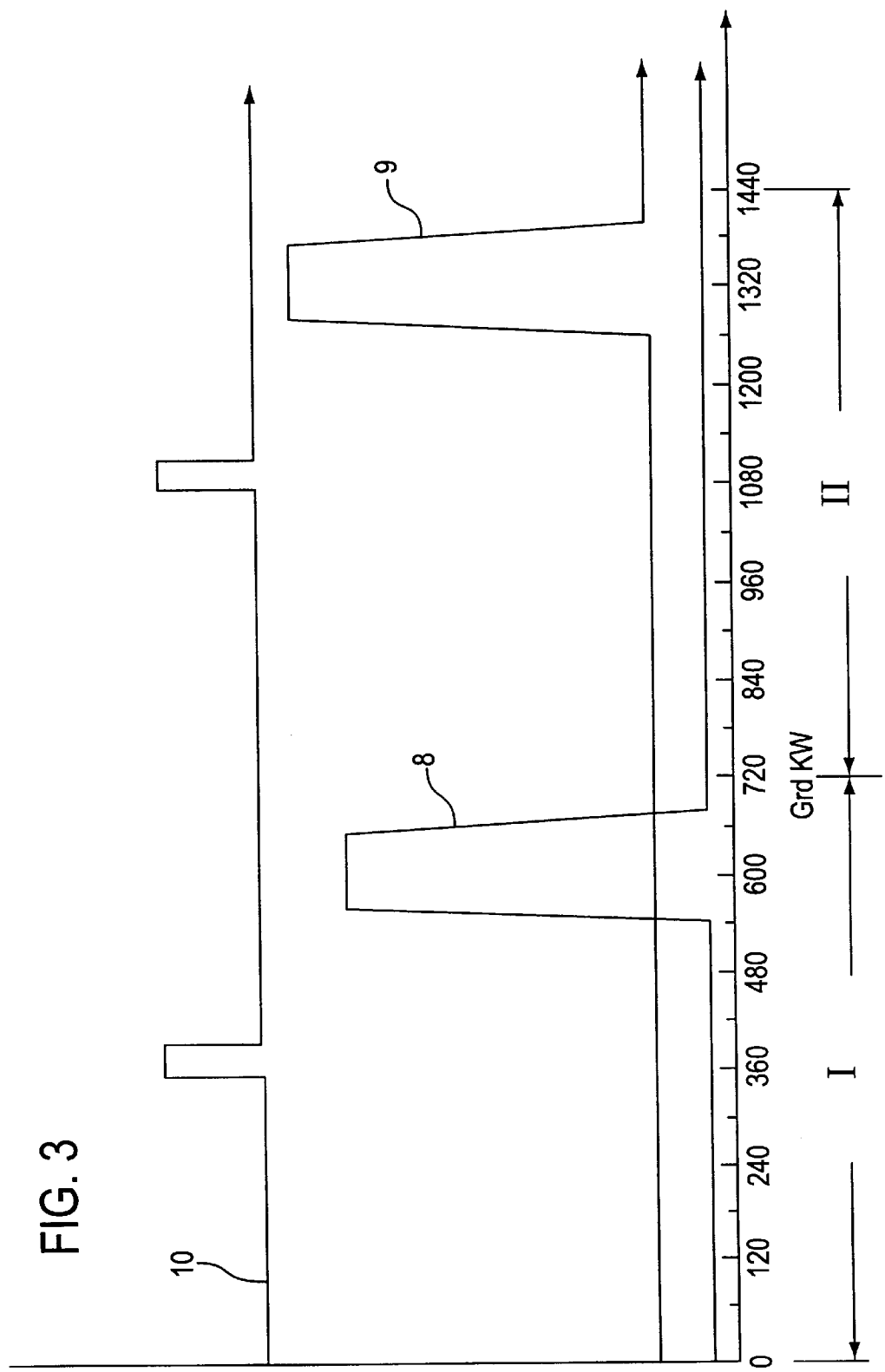
FIG. 3 is a diagram illustrating the actuation in time of the fuel injection nozzle and the intake valves as a function of the crankshaft angle.

The diagram shown in FIG. 3 illustrates the above-described method for two successive operational cycles I and II. The curves 8 and 9 show the beginning, the duration and the end of operation for the intake valves 3 and 4, respectively. The curve 10 illustrates the operation of the fuel injection nozzle 5. All three curves are shown as a function of the crankshaft angle. As may be seen from curve 10, the fuel injection nozzle 5 opens once for each operating cycle, that is, it opens successively in cycle I and in cycle II. In contrast, the intake valve 3 opens only during cycle I, while the intake valve 4 remains inoperative (closed). In the successive cycle II the intake valve 4 opens while the intake valve 3 remains inoperative (closed), so that in each successive operational cycle the intake valve 3 and the intake valve 4 are alternatingly actuated.

It will be understood that the above description of the present invention is susceptible to various modifications, changes and adaptations, and the same are intended to be comprehended within the meaning and range of equivalents of the appended claims.

What is claimed is:

1. A method of controlling a piston-type internal-combustion engine having a cylinder, first and second intake ports opening into the cylinder and first and second intake valves disposed in the first and second intake ports, respectively, for controlling admission of fuel into the cylinder, the method comprising the following steps:

(a) injecting fuel simultaneously into said first and second intake ports during operational cycles of the cylinder;

(b) at low engine load operating solely one of the first and second intake valves, while maintaining the other of the first and second intake valves inoperative; and (c) alternating step (b), whereby the first and second intake valves are alternatingly in an operative and in an inoperative state during consecutive operational cycles of the cylinder.

* * * * *